United States Patent [19]

Hedman

[11] Patent Number: 5,444,915
[45] Date of Patent: Aug. 29, 1995

[54] LINK SYSTEM
[75] Inventor: Lennart D. Hedman, Roscoe, Ill.
[73] Assignee: The Ingersoll Milling Machine Company, Rockford, Ill.
[21] Appl. No.: 193,705
[22] Filed: Feb. 9, 1994

Related U.S. Application Data

[60] Division of Ser. No. 125,295, Sep. 22, 1993, Pat. No. 5,337,462, which is a continuation of Ser. No. 913,564, Jul. 14, 1992, abandoned.

[51] Int. Cl.⁶ .............................................. G01C 15/02
[52] U.S. Cl. ........................................ 33/293; 33/286
[58] Field of Search ................................. 33/286, 293

[56] References Cited

U.S. PATENT DOCUMENTS 3,188,739 6/1965 Olsen et al. ..................... 33/293 X

OTHER PUBLICATIONS

A brochure entitled *The Valenite E-Z System of Precision Boring of GTE Valenite*, Troy, Mich., dated prior to Jul. 14, 1991.

Keuffel & Esser Company Catalog, Catalog 9, *Optical Alignment Equipment*, 1974, pp. 29–31.

*Primary Examiner*—Alvin Wirthlin
*Attorney, Agent, or Firm*—Fitch, Even, Tabin & Flannery

[57] ABSTRACT

A target is provided for attachment to a milled locator surface on a machine or to a fixture carrying a part to be machined. A plurality of spaced targets may be used to establish a datum plane. The target has an outer planar flat surface to be engaged by an indicator or used with a laser positioner device. The outer planar flat surface is located at a fixed distance from the milled locator surface, and this distance is usually recorded by indicia on a plate adjacent the indicator or on a cover that covers and protects the target. The outer target surface is parallel to the milled locator surface. To achieve this, the body of the target has inner, planar precisely finished surface that is parallel to the outer planar surface which is on the end of a threaded shaft. The precisely finished, inner planar surface is abutted against the milled surface on the tool or fixture. Anti-backlash springs remove any play from the threaded engagement.

5 Claims, 7 Drawing Sheets

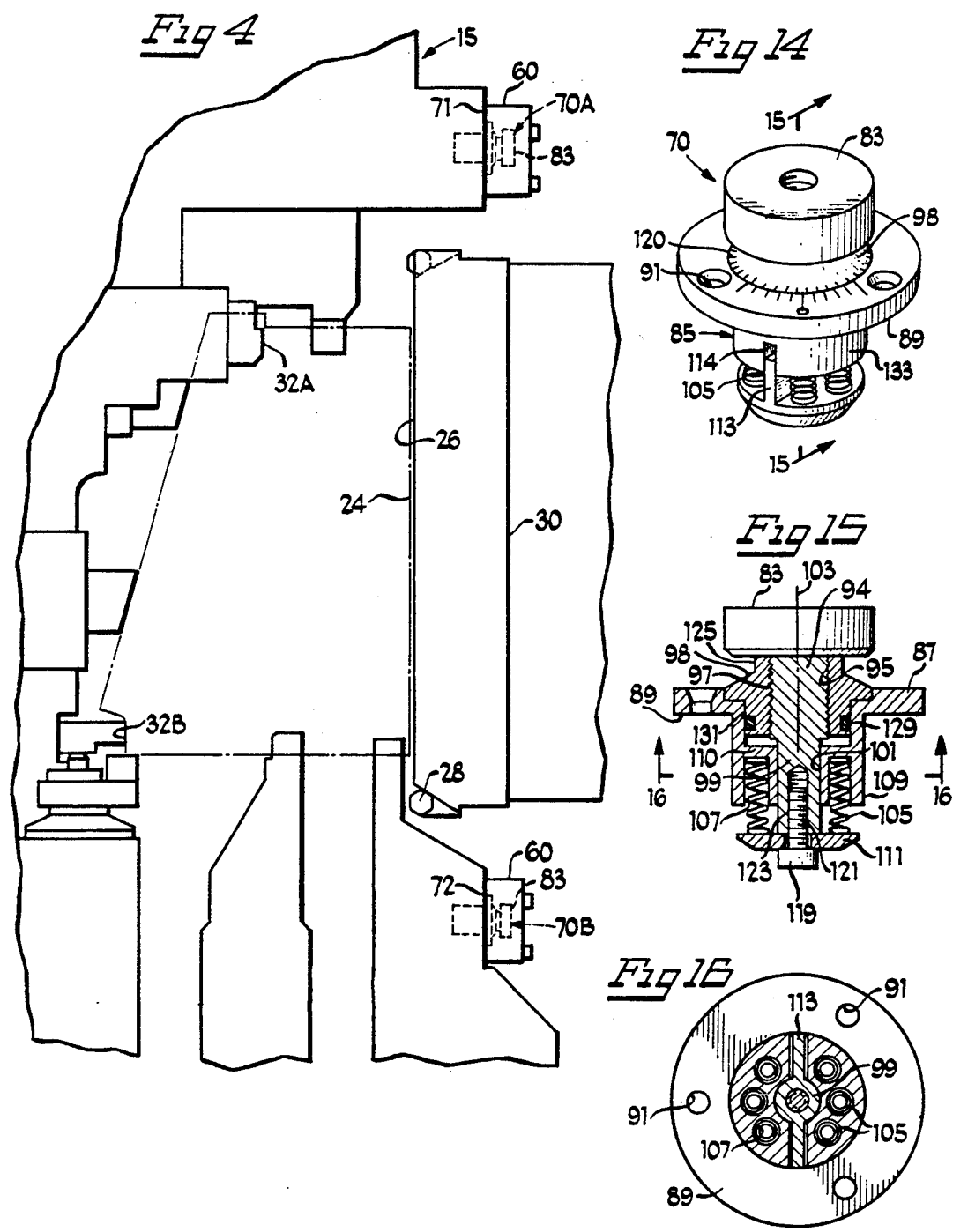

Fig 10

FINISH OPERATIONS

| PART PRINT FEATURES | PRO-CESS | FIXTURING | MACH | UNIT | LCC | DIA | DIH | OTHER | P/P TOLS | IN-PROCESS TOLERANCES | X Y TOLS | PPK %P/P | R.D.S. | AIM (X̄) | RANGE |
|---|---|---|---|---|---|---|---|---|---|---|---|---|---|---|---|
| JOINT FACE -A- | MILL | X Y Z | 30 | 5R | * | | | | | ⌀ .130 X | ±.065 | 1.00 | .043 | ±0.016 | ±0.05 |
| | | | | | | | | * | ⌀ 0.130 | | | 50% | .065 | ±0.016 | ±0.04 |
| | | | | | | | | * | ⌀ 0.05/150 LG | | | 50% | .025 | ±0.006 | ±0.01 |
| | | | | | | | | * | 63 ▽ | | | | | | |
| -A1- | MILL | X Y Z | 10 | 2R | * | | | | | ⌀ 0.130 X | ±.065 | 1.0 | .043 | ±.016 | ±.049 |
| TOP DECK | MILL | A1 106 126 | 10 | 4L | * | | | | ⌀ 0.3 A | ⌀ .237 X Y Z | ±.119 | 1.67 | .047 | ±0.018 | ±0.04 |
| | MILL | A1 106 126 | 10 | 4L | * | | | | | ⌀ 0.500 A 106 126 | ±.250 | 1.0 | .165 | ±.063 | ±.123 |
| VALVE C'BORES-INTK #147-158 | MILL | A1 106 126 | 10 | 11R | * | | | | ⌀ 0.5 N | *⌀ 1.497 A 106 126 | ±.248 | 50% | .125 | ±0.031 | ±0.09 |
| | | | | | | | | | 43.0 ±0.5 | | ±.5 | 1.33 | .248 | ±0.94 | ±0.20 |
| | | | | | | * | | | 16.00 ±0.50 | 17.016 | ±.483 | 80% | .400 | ±0.100 | ±0.30 |
| | | | | | | | | * | K↙ | | | | | | |
| | | | | | * | | | | ⌀ 0.08 N | *⌀ .056 A 106 126 | ±.028 | 1.67 | .028 | ±0.011 | ±0.01 |
| | | | | | | | | | 47.950 ±0.025 | | ±.025 | 1.67 | .010 | ±0.003 | ±0.00 |
| | | | | | | * | | | 14.00 ±.100 | 15.016 | ±.040 | 80% | .032 | ±0.008 | ±0.02 |
| | | | | | | | * | | 5.7 ±.200 | 6.716 | ±.178 | 1.00 | .117 | ±0.044 | ±0.08 |
| | | | | | | | | * | 2.5 ▽ | | | | | | |
| | BORE | A1 106 126 | 10 | 11R | * | | | | | *⌀ 0.267 A 106 126 | ±.095 | 1.0 | .062 | ±.024 | ±.047 |
| BOLT HOLES #103-128 | DRILL | A1 106 126 | 10 | 7R | * | | | | | 47.747 | ±.060 | | | | |
| | | | | | | * | | | *⌀ 0.58 A B C | *⌀ .798 A 106 126 | ±.400 | 1.33 | .199 | ±.075 | ±.16 |
| | | | | | | | | | 20.5 +.500/−.150 | 20.675 | ±.325 | | | | |

Fig 12     JOINT FACE MILL MACHINE COMPONENT STIFFNESSES

\* ALL DEFLECTIONS AND STIFFNESSES RELATED TO TOOL POINT

| COMPONENT | STIFFNESS (LBS/IN) | | | DEFLECTIONS (IN) | | |
|---|---|---|---|---|---|---|
| | X | Y | Z | X | Y | Z |
| BASE | 11,087,704 | 29,342,723 | 13,728,720 | | | |
| BOT SLIDE, FEEDBOX & BALLSCREW | 23,304,591 | 27,173,913 | 1,086,484 | | | |
| TOP SLIDE, FEEDBOX & BALLSCREW | 1,250,000 | 16,223,232 | 10,626,993 | | | |
| SPINDLE & RETNR | 4,376,368 | 17,277,125 | 17,277,125 | | | |
| HEAD & MOTOR | 40,144,520 | 29,967,036 | 21,602,938 | | | |
| | | | | | | |
| COMPONENTS (COMBINED) | 842,808 | 4,468,675 | 839,010 | | | |
| FULL MODEL (MEASURED) | 797,448 | 3,667,033 | 752,445 | *0.00671 | *0.00463 | *0.00934 |

0.00516

\* MAX MILLING LOADS: 4118 LBS
                         7865 LBS
                         5945 LBS

Fig 13     JOINT FACE MILL MACHINE COMPONENT STIFFNESSES

\* ALL DEFLECTIONS AND STIFFNESSES RELATED TO TOOL POINT

| COMPONENT | STIFFNESS (LBS/IN) | | | DEFLECTIONS (IN) | | |
|---|---|---|---|---|---|---|
| | X | Y | Z | X | Y | Z |
| BASE | 11,087,704 | 29,342,723 | 13,728,720 | | | |
| BOT SLIDE, FEEDBOX & BALLSCREW | 23,304,591 | 27,173,913 | 1,086,484 / 2,886,650 | | | |
| TOP SLIDE, FEEDBOX & BALLSCREW | 4,692,633 | 16,223,232 | 10,626,993 | | | |
| SPINDLE & RETNR | 4,376,368 | 17,277,125 | 17,277,125 | | | |
| HEAD & MOTOR | 40,144,520 | 29,967,036 | 21,602,938 | | | |
| | | | | | | |
| COMPONENTS (COMBINED) | 1,667,750 | 4,468,675 | 839,010 | | | |
| FULL MODEL (MEASURED) | 1,332,945 | 3,667,033 | 752,445 | *0.00484 | *0.00463 | *0.00934 |

NOTE: STIFFNESS IN X-AXIS INCREASES BY 67% OVER ORIGINAL DESIGN

\* MAX MILLING LOADS: 4118 LBS
                         7865 LBS
                         5945 LBS

LINK SYSTEM

This is a division of application Ser. No. 125,295, filed Sep. 22, 1993, U.S. Pat. No. 5,337,462, which is a continuation of application Ser. No. 913,564, filed Jul. 14, 1992, abandoned.

The invention relates to a method of building a machine system having a plurality of cutting machines and to a system of such machines.

This invention is directed to a method of manufacturing a number of machines, each of which is directed to making a successive cut in a part or workpiece such that the tolerances of one cut may affect the tolerance of the subsequent cuts. The typical approach used today is to analyze the part tolerances involved in these related i.e., linked cutting operations, and to provide a total tolerance for these cutting operations by taking the square root of the sum of the squares of the individual tolerances. Tolerances do not combine arithmetically. Tolerances are then split or budgeted for each of the machines involved, e.g., milling, boring or drilling machines. These tolerances are used to generate statistical quality control tolerances, using known statistical quality control techniques to assure that the machining process is capable of producing parts effectively over a long production run within the desired tolerance range. This statistical quality control involves the use of the normal distribution curve and sigma deviations. A process capability ratio is calculated by dividing the six sigma range by the total tolerance and expressing the answer in percent. There is also developed a statistical "aim" and "range" tolerance which is calculated and analyzed to see if the process should be capable of meeting the statistical quality control requirements. If not, then the tolerances may be adjusted or a different arrangement of fixtures or kinds of milling machines are used to see if a satisfactory statistical quality control level can be achieved.

The ultimate test sample is an actual test sample of parts manufactured by the system. The parts are inspected and their tolerances noted, e.g., fifty parts may be manufactured during an acceptance run in the system manufacturer's plant. Experts will then look at an image of the part and make adjustments to try to make the next cut result in parts to print tolerance after the next cut of the part. The cut parts are the mirror image of the machine. One problem with this approach is that it does not identify for the manufacturer where the source of error is located, e.g., in a milling machine it may be in the fixture locators, the milling machine stiffness, the cutting tool geometry, the spindle face perpendicularity to the part, an inclination in the feed slide for the tool, or depth of the tool cut. Also, the fixture and cutting process variables from one cut effect the next cut, and may add variables such that the finally inspected part does not provide much information as to where the source of the error is located.

Such systems are built and tested at the system manufacturer's plant, so that changes in stiffness and adjustments to the machines can be made. In such complicated machining systems involving closely held and inter-related tolerances, the time of building and testing the manufacturer's plant may be three months or more where large milling machines and boring machines are used. After the acceptance part runs are satisfactory from a part print tolerance and from a quality statistical control standpoint, the system is disassembled and shipped to the end user and reassembled. Another acceptance run is then made to assure that the reassembled system produces parts within the part print tolerance and to the statistical quality control requirements.

There is a need for a method of manufacturing such systems that can provide a system of machines linked together that the first workpieces off of the linked machines can be good parts within part print tolerance and under statistical control, or if not the first part, that subsequent parts can be readily brought into acceptance by a few minor adjustments. It is thought that eventually this invention may allow the initial building of such machine systems on the customer's site from components designed and tested at the manufacturer's plant, such that the three months used for building and testing of the system at the manufacturer's plant can be eliminated. This eliminates one assembly and disassembly of the machine at the manufacturer's plant. Such an improvement is needed in the art of the types of machines herein described.

As is well known, there is a drift in capability of the machines and processes with time which results in parts with larger tolerances, or more parts out of acceptable tolerances. Also, a part on the machine or fixture may break or become worn and cause parts not to meet print tolerances. In such cases, there is a need to ascertain the source of the error appearing in the inspected parts, and to identify the machine that is the source of the error. There also is a need to assist the operator to be able to quickly adjust and realign the machine and/or fixture involved to its original setup dimensions and tolerances to again produce parts to their original tolerances that machines achieve when accepted.

SUMMARY OF THE INVENTION

The present invention involves taking those cutting operations that are linked to a final print tolerance for a part and properly budgeting from a total tolerance not only to fixtures and to the machines, but also in manner to determine stiffness requirements and the tolerances for such things as tool cut depth, tracking of feed slide and perpendicularity of the spindle face. The latter involves very fine tolerances, which heretofore, could not be properly gauged, but are properly gauged in this invention by the use of special reference datum surfaces on the fixtures and machines. The targets are mounted on the fixture on the fixture to provide a "granite" plane from which very precise measurements may be made to initially set up the machine with assigned tolerances for such things as tool depth, tracking of the feed slide, and perpendicularity of the spindle face. These assigned and budgeted tolerances are used initially to set up the machine and are recorded preferably on the machine prints and in a database. In the preferred embodiment of the invention, dimensions and tolerances are recorded next to the targets, such as being stamped on a cover plate for a cover housing a target on the fixture and a target on the machine cutting head.

In the preferred system, the statistical aim and range tolerances developed for a given machine are budgeted among: (1) a fixture assembly; (2) a machine assembly group of tolerances for depth of cut, tracking and spindle perpendicularity; (3) cutting tool geometry; and (4) system deflection, including workpiece and machine frame deflection tolerances. A finite analysis of the fixture, cutting tool and machine frame allow an understanding of the stiffness need, particularly for the machine frame. By allocating the total locational tolerance from the aim and range tolerances to each of the above-listed four items, the tolerance assigned for machine deflection can be compared to the machine frame deflection calculated by dividing the cutting force by the machine frame stiffness. If the calculated stiffness is larger than the finite analysis stiffness for the selected machine frame, then this selected machine is not stiff enough to hold this deflection tolerance. Often, by an examination of the elements of the machine, an element can be made larger, or a different, stiffer element can be substituted so that the final built machine will have the stiffness to hold to the deflection tolerance budgeted. Of course, changes can be made to fixtures to increase their stiffness and assign some of its deflection tolerance to the machine frame.

The cutting of the milling face will be in a compound plane because the part is never in a perfect plane, the cutter and spindle face will never be perfectly perpendicular to the part and the movement along the feed slide is never in a perfect straight line. By using the square root of the square of tolerances for items 1, 3 and 4 enumerated above, the total tolerance for machine assembly group is determined and it is then apportioned and budgeted among the depth of cut, feed tracking and spindle perpendicularity.

Because the targets provide such granite planes, indicators can be mounted on the spindle to sweep a pair of targets on the fixture and used to precisely level the spindle face to a tolerance, e.g., 0.00035 inches not heretofore obtainable. Likewise, a pair of targets on the fixture may be swept by an indicator travelling with the cutting head along the feed slide and a tracking means may be adjusted to provide a precise tracking tolerance, e.g., 0.001 inches. By using one target on the feed head and another target on the fixture, the depth of cut may be held to a very precise tolerance such as, for example, 0.00035 inches. A suitable depth of cut stop may be machined to this tolerance to hold this depth of cut. All of these dimensions and tolerances are recorded on prints or in a database, so that the machine can be later tested for alignment and realigned to these original setup dimensions and tolerances.

When a part is later found to be defective because it is not to tolerance, the source of the error can be detected by cutting sample parts at each of the linked milling machines and then inspecting the parts from each machine. The part dimensions and tolerances coming from each machine are on the in-process tolerance chart. The machine not producing the part to tolerance is identified. Then, the identified machine is inspected by attaching indicators and measuring to the targets which have been uncovered. The targets have the dimensions and tolerances at which the machine was originally set up, and this same data is on the machine prints. Thus, the machine part or locator surface on the fixture that has become worn or broken can be found, because it will no longer be at the original targeted dimension. The machine and fixture can then be realigned to the original setup dimensions. The first parts from the realigned machine should be good parts. This trouble-shooting, using the targets and these finely budgeted tolerances, saves the operator downtime and expense to get back into production and also allows the operator to identify the root cause of the problem and to correct it.

The preferred targets are very precise reference devices having one precisely finished surface, such as on a mounting flange secured to a milled surface on a fixture, or the machine head and a second outer parallel datum reference surface precision machined parallel to the flange surface. The reference datum surface is axially moveable in the target body, so as to be moved to the exact dimension desired with respect to another surface, such as the locator on the fixture. Herein, a micrometer nut with a thread meshed on the datum surface element shifts the datum surface axially through 0.0001 inches for each mark on a micrometer scale on the nut. The threads are preloaded by springs to prevent backlash and to retain the micrometer setting over a long period of time. Preferably, the target is covered and its dimension and tolerances are recorded on a plate on the cover along with the micrometer reading. The targets should be inexpensive, since a large number may be used, such as 130 for the entire system which is only partially described herein.

BRIEF DESCRIPTION OF THE DRAWINGS

For a better understanding of the invention, reference will be made to the drawings wherein:

FIGS. 2, 3 and 4 are elevational views of a machine tool having fixture locator surfaces 32 and also datum reference surfaces or targets 70;

FIG. 5 is a volumetric representation, in an oblique view, of how the total machine assembly tolerance is split between depth position, tracking and spindle face alignment to the fixture;

FIG. 6 is a plot of the tolerance distribution curve illustrating a 0.016 mm deviation of tolerance and a 0.040 mm range;

FIG. 7 is a volumetric, oblique representation of tolerance for a joint face milling operation, illustrating the allocation of 0.0018 inch to system deflections of the workpiece and frame;

FIG. 8 is a front view of a part 22;

FIG. 9 is an enlarged, detail view of a portion of FIG. 8;

FIG. 10 is a chart illustrating how the invention is implemented;

FIG. 12 is a chart illustrating how various parts of the machine shown in FIG. 11 contribute to deflections;

FIG. 13 is a chart similar to that shown in FIG. 12 illustrating the effect of stiffening one component on deflections;

FIG. 14 is an isometric view of a target;

FIG. 15 is a sectional view of the target shown in FIG. 14; and

FIG. 16 is a bottom view of the target shown in FIG. 14.

DETAILED DESCRIPTION OF THE PREFERRED EMBODIMENT

Figure 1:
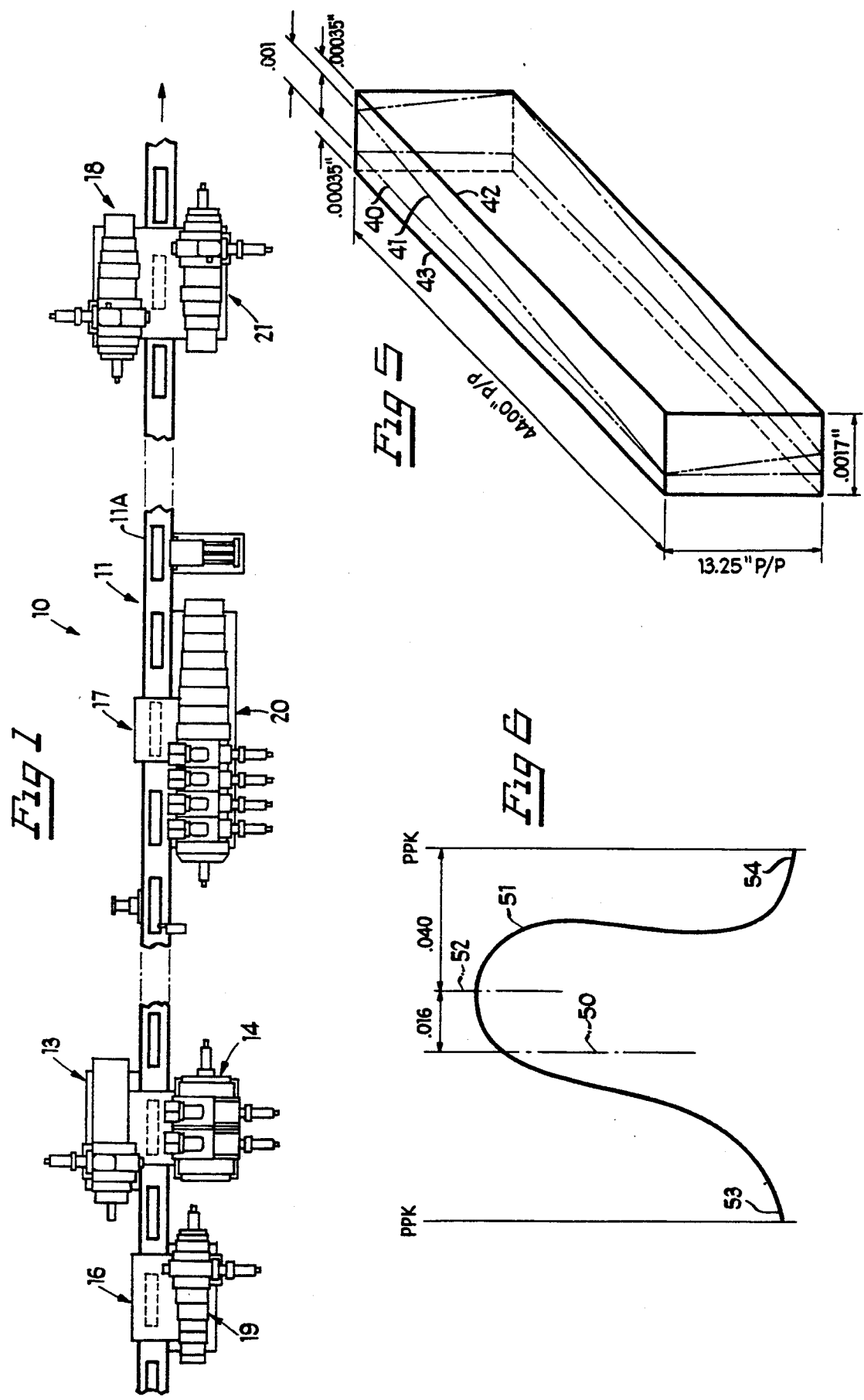
FIG. 1 is a plan view of an automated transfer line apparatus with multiple stations at which workpieces are machined.

As shown in the drawings for purposes of illustration, the invention is embodied in a transfer line apparatus 10 (FIGS. 1 and 2) which includes a transport means 11 such as a conveyor 12 which carries part 22 through a plurality of machining stations or machines 16, 17 and 18 at which are located various cutting machines such as a milling machine 19 at a semi-finish joint face station 16 and a boring machine 20 for a finishing valve counterboring station 17, and a milling machine 21 for finishing the joint face 24. The illustrated transfer line has a large number of additional stations and cutting machines at these additional stations, which have been omitted for the purposes of clarity. The illustrated workpiece or part 22 is a cylinder head for a diesel motor. The invention is described with respect to this embodiment of a transfer line involving a number of cutting machines and to a particular kind of workpiece; but the invention is not limited to any particular apparatus nor to any particular machining operations, as described herein.

Figure 2:
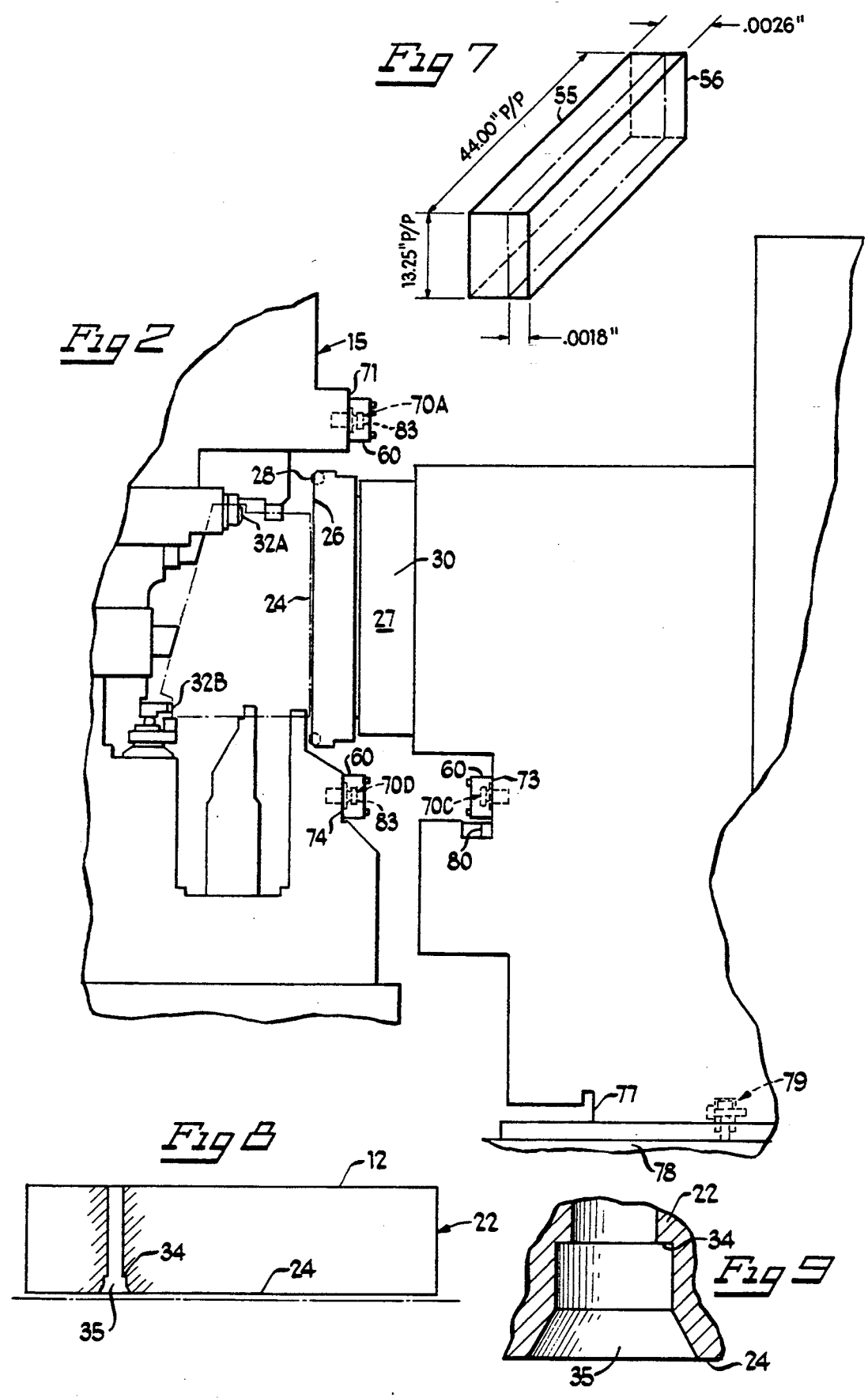
Figure 3:
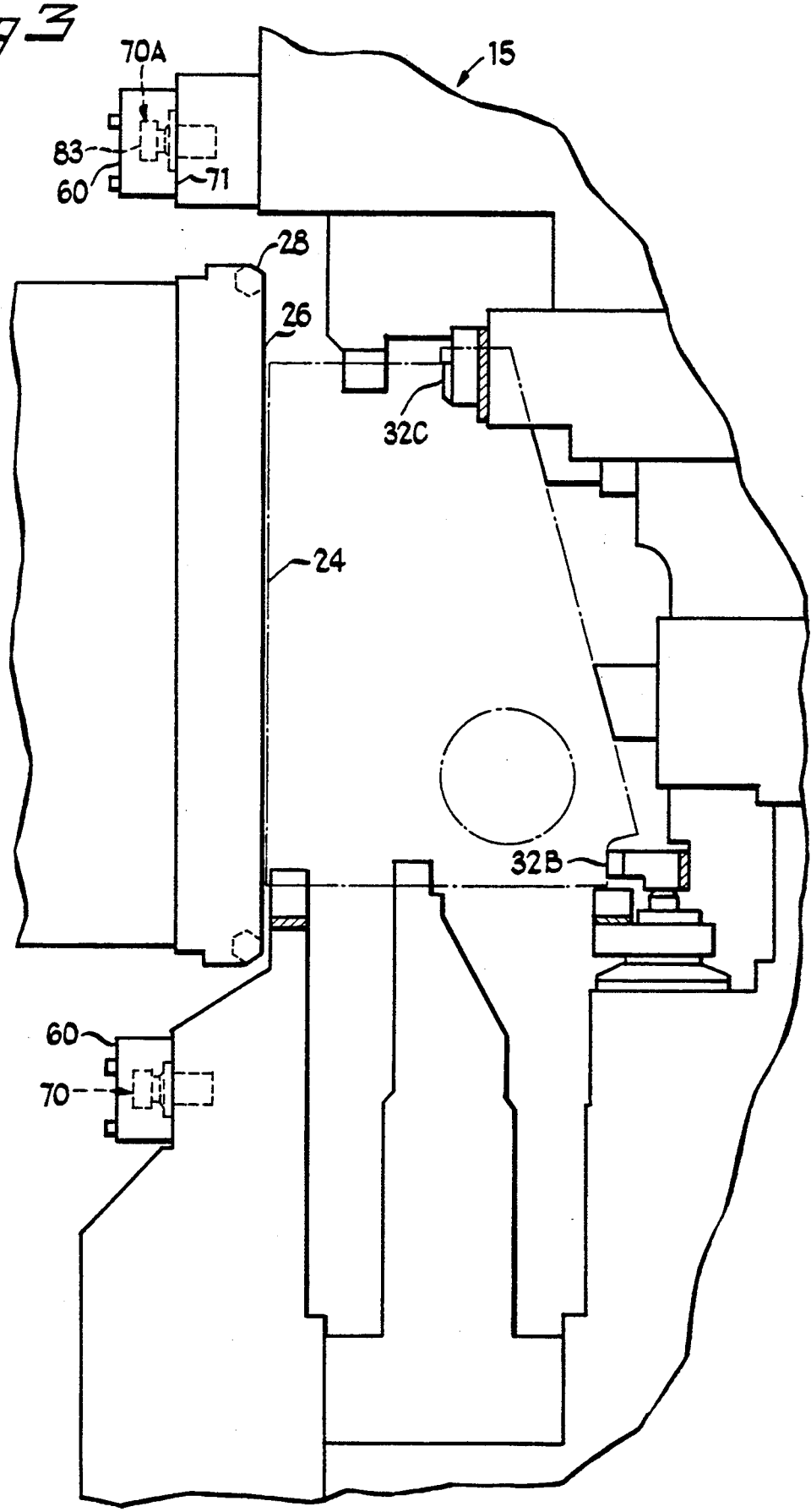

As shown in FIGS. 2, 3 and 4, the part 22 is in the form of an engine head mounted on the fixture 15 with a joint face 24 of the part extending vertically adjacent a spindle face 26 carrying cutting inserts 28 for cutting the joint face 24 as the spindle 27 is rotated. The part is mounted in the fixture with the part abutted against at least three locators or surfaces 32A, 32B and 32C on the fixture. Thus, the depth of the milling cut to machine the joint face is at a predetermined distance from these locator surfaces 32A, 32B and 32C when finished. Locators 32A and 32B are shown on the fixture 15 in FIGS. 2 and 4.

FIG. 3 is a view from the other side elevation of the fixture 15 and shows the third locator 32C for the upper portion of the part at a location opposite and at the same general height as the locator 32A. The preferred locators 32A, 32B and 32C are precision surfaces on the fixture which locate the part for the cutting process.

In the illustrated process, a counterbore surface 34 (FIG. 9) for a valve opening 35 must be held by tolerance on the customer's print to a ±0.1 mm from the finished joint face 24. But here the first station at which the cutting is made is a semi-rough finish surface made by the machine 16, and the user wanted the joint face surface to be finished at a much later time in the process at the finish joint face station 18. In this illustrated example, the bore surface is to be at a tolerance of ±0.1 mm from the finished joint face 24. This tolerance must be spread over three machines because a large error at either the rough finish mill or final finish mill could change the counterbore depth as easily as does machining the depth of the counterbore surface 34 too shallow or too deep. These three machines are thus connected to each other and are statistically linked to each other. The next step is to determine the in process tolerances needed for those three stations to make this finished counterbore depth. In this analysis, account must be taken where the datum plane is for the dimension which is from the finished joint face which brings into play the finishing joint face tolerances.

Having identified the three stations 16, 17 and involved, an error tolerance budget is then made using a square root of the squares of the tolerances is made of the tolerances to be used for each of the three stations. The tightest tolerance feature in this example is the counterbore depth of ±0.1 mm. Based on experience, in this instance, a known tolerance of 0.080 mm is allocated for the counterbore station and an assumption is made that because both joint face milling machines 18 and 19 will locate from the same locator datum, both require the same or "X" tolerance.

The total tolerance for the root mean square equation will then be equal to 0.2 mm because the plus 0.1 mm and the minus 0.1mm, when added together, give a 0.2 mm tolerance, $$.2 = \sqrt{3 x^2}$$

$$.2 = \sqrt{2 x^2 + .08^2}$$

$$.2^2 = 2 x^2 + .08^2$$

$$x = \sqrt{1/2(.2^2 - .08^2)}$$

Recheck:

$$\sqrt{.1296^2 + .1296^2 + .08^2} = .2$$

This, the in process tolerances are as follows:
semi-finish milling station 16 is =0.1296 mm
counterbore station 17=0.08 mm
finish milling station 18=0.1296 mm The joint face milling machine tolerances have been split evenly in an arbitrary manner. However, if it were found, for example, that the rough finishing milling station 16 resulted in a tolerance of 0.140 mm and the finish milling station 18 had a tolerance which could be held to 0.120 mm or less, then the root mean square would still total 0.2 mm and be all right. Thus, an in-process error budget has been developed for these three stations 16, 17 and 18.

The part 22 also includes an opposite face herein called top deck face 12 (FIG. 8) which will be milled in another fixture (not shown) at a top deck milling station 13 by a top deck milling machine 14 (FIG. 1). The top deck milling station 13 is immediately after the semi-finish station 16 for milling the joint face 24. The counterbore is then milled in the joint face at station 17, and the finish milling of the joint face 24 occurs at the last illustrated station 18. The finished joint face is at a tolerance related to the finished deck surface. Therefore, because the top deck milling station has a tolerance related to the joint face finish milling station 18, the in-process tolerance developed for the joint face has to be included in a process error budget for the top deck milling at station 13. The part print tolerance for the top deck is 0.300 mm. It is already known that the tolerance for joint face milling stations 16 and 18 are 0.1296 mm and 0.1296 mm, respectively, which can be rounded off to 0.13 mm. Calculating the in-process tolerance for the top deck machine using the root mean square equation:

$$.3 = \sqrt{[(2) \cdot 13^2] + X^2}$$

$$.3^2 = [(2) \cdot 13^2] + X^2$$

$$\sqrt{.3^2 - [(2) \cdot 13^2]} = X = .237$$

Recheck:

$$\sqrt{.237^2 + .13^2 + .13^2} = .3$$

The top deck station 13 is prior to the finish joint face milling station 18 because the user wants to have most of this machining performed before doing the final joint face milling because the user did not want chips going down into holes in the head. The usual operation would have been to mill the finish face after the finish joint face to have available the full 0.300 mm for machining the top deck; which now has to be held to an in-process tolerance of 0.237 mm. If the in-process tolerance had been too low, e.g., 0.080 mm, then the top deck machine would have to be positioned after the final finish joint station for the joint face whereby the print tolerance of 0.300 mm would be available for machining the top deck. Thus, one must look at the cutting process and the fixturing process and determine what machining operations and tolerances are linked together. By budgeting their respective tolerances to each of the machines involved, the ultimate tolerances found will validate whether or not the selected machining process is doable. In other instances, this process will tell you that the process needs to be altered, and for what reasons the process needs to be altered. Thus, the upper and lower control process tolerances have been developed and are shown in the in-process tolerance chart of FIG. 10. The chart of FIG. 10 designates in the left-hand column, the part print features such as the joint face and the top deck. The "A" in Column 1 next to "joint face" refers to the part print identification of that feature as a datum to which other features of the part will be tolerated. The next column describes the machining process used to create the feature, i.e., milling, drilling, or boring. In the third column, the fixturing used by the process is X, Y and Z, which refer to the locator surfaces 32A, 32B and 32C on the fixture 15. The next several columns relate to the machine and its location in the transfer line. The column "P/P Tol" refers to the print tolerances for the finished part. Thus, the part print tolerance for the top deck is "0.3 mm" from datum A in the part print tolerance column. An analysis is done to determine the effects of a mismatch in the fixture datums and the part datums. The error of the fixture datum must be accounted for if the two columns do not agree.

The datum A is the rough finish, joint surface initially cut on the part. In the "Fixturing" column for the Top Deck, there is shown this datum A and two fixturing dowel holes 106 and 126 that are to be used by the process to locate the part for machining. The symbol ⌂ in the column P/P Tol relates to a finished surface that is to be held within 0.3 mm from a datum A. The in-process tolerance above calculated to meet that 0.3 mm is shown in the "In-Process Tolerances" column as 0.237 mm. The next column shows X and Y tolerances, which are determined by dividing in one-half the 0.237 mm to give 0.119 mm in the column "X,Y Tols".

Contractually, at the time of part specifications, there is provided by the end user quality statistical control data which is listed in the columns on FIG. 10 as P.P.K., % P/P. The P.P.K. indicates the post process capability that is desired, which is 1.67 for the top deck. This P.P.K. goes into an equation along with the in-process tolerance to compute an area under the distribution curve of FIG. 6. By way of example, if an acceptance run of fifty parts were measured, the tolerances would be added and divided by 50 to compute the average tolerance error from the nominal dimension. In the example of FIG. 6, the nominal dimension is indicated by the line 50; and a tolerance distribution curve 51 is shifted to the right to show a deviation of tolerances of 0.016 mm which is under the Aim of 0.018 mm listed for the top deck. The aim is the average tolerance error from the target, nominal dimension at line 50. If the parts were perfect, the bell curve 51 would be centered on the nominal dimension line 50. Instead, the bell curve deviation is shifted to the right by 0.016 mm, as shown by the line 52 through the center of the bell curve. In addition to average error, it is desired that the ends 53 and 54 of the curve be within the specified range of 0.040 mm, as shown in FIG. 6 and specified in the last column of FIG. 10 for the top deck.

If some parts had a very wide deviation from the average error, e.g., 0.040 mm, then the average error of 18 would meet the aim; but the occasional tolerance errors would be too large to provide consistently acceptable parts and changes would have to be made to reduce the range to 0.040 mm. The R.D.S., which is the Raw Data Spread, is the allowable range of data if the average was nominal. As the average departs from nominal, the range of data gets smaller. It is the area under the curve 51 that is statistically significant and by proper calculations the aim and range for a very large commercial production, e.g., of a million parts can be calculated from the data generated and shown in FIG. 6 after inspection of a small acceptance run of parts. When producing so many parts over a long period of time, the range can be expected to be extended substantially as well as the average error may drift. Thus, the apparatus is designed to produce parts for the small acceptance run that has a curve substantially smaller in area than will be the distribution curve calculated for large production runs made over the life of the machine when wear causes drift and statistical tolerances add to make an occasional part out of print tolerance. The statistical data should meet the six sigma or deviation that will result in 99.74% of the parts within the tolerances meeting under the part print tolerances. Thus, statistical criteria are met in this instance for the post process capability specified at 1.67 for the top deck. Using current computer programs, the actual inspection data from the inspected parts can be used to generate the distribution curve of FIG. 6; and theoretical statistical distribution curves can also be generated from the P.P.K. and R.D.S. values. The curves show that the parts produced should meet print tolerances in 99.74% of the time, in this illustrated example of the invention. If the P.P.K. were 1.0 rather than 1.67 for the top deck, the area under the bell curve would be larger. On the other hand, if the top deck P.P.K. were 2.0 rather than 1.67, the area under the bell curve would be smaller. The larger area allows for more deviation for the aim and range.

Looking at the joint face milling operation is known that the cutter face 26 will be traveling in a compound plane because: (1) the part will be tipped slightly from the pure theoretical planar position, (2) the part will deflect slightly under tool pressure, (3) the tool will deflect slightly under pressure, and (4) the machine cannot be built to perfect alignment and withstand the forces to maintain perfect alignment. This may be viewed volumetrically in FIG. 7 where the joint face is shown as having a 13.25 inch width cut and a 44.00 inch long cut from the print dimensions. It will be seen that from the chart of FIG. 10 that joint face 24 has an aim tolerance of ±0.016 mm, which when added to the range tolerance of ±0.050 mm provides a total tolerance of 0.066 mm. Because this dimension is plus or minus, only one-half of this total is used, i.e., 0.066 mm. Converted to inches this 0.066 mm is equal to 0.0026 inch, which is volumetrically shown in FIG. 7 as the width between two parallel vertical planes. Thus, the cutter face to stay within tolerance must cut and travel within two vertical planes 55 and 56 in FIG. 7, which are spaced apart at 0.0026 inch.

The budgeting of this total tolerance of 0.0026 inch can now be visualized and apportioned. In this instance, a tolerance total of 0.0018 inch is assigned from the 0.0026 inch to "system deflections" of the workpiece and machine frame. The spring rate of the workpiece has been determined by finite analysis to be 2,400,000 lbs./inch.

Figure 11:
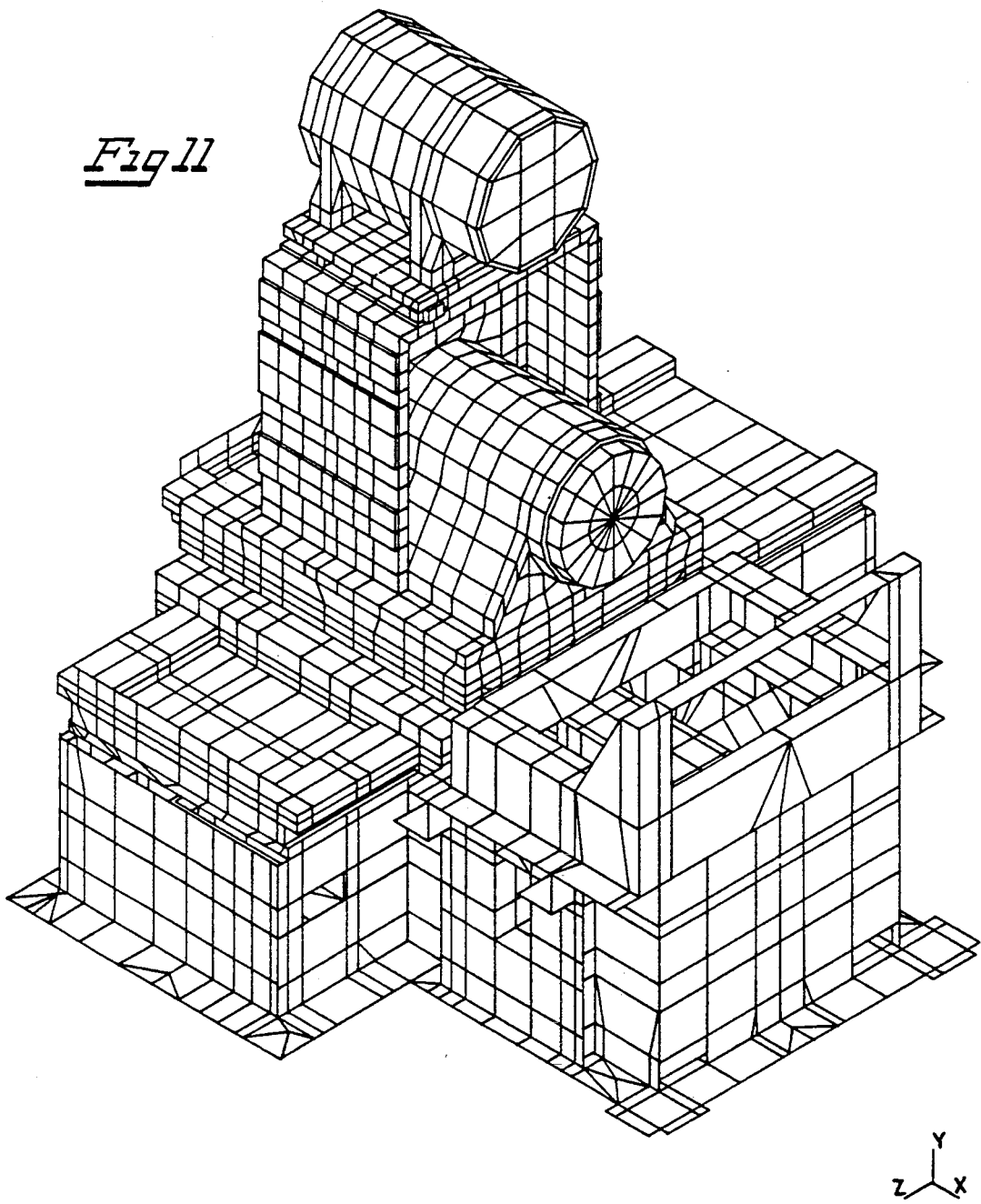
FIG. 11 is an isometric view of a machine illustrating its breakdown, for computer analysis purposes, into finite elements.

The cutting force of 1,452 lbs. is also known. The workpiece deflection is calculated by dividing the cutting force of 1,452 lbs. by the workpiece stiffness of 2,400,000 lbs./inch, which equals a deflection of 0.0006 inch. If the total system deflection allowed is 0.0018, then a deflection of 0.0012 inch can be assigned for the machine deflection. If you divide this 0.0012 inch deflection by 1,452 lbs., you can calculate the stiffness needed for the machine, i.e., 1,200,000 lbs./inch. This is a very high stiffness that would not be achieved with a generic usual milling machine that may have been provided to do this joint face milling. The finite analysis of the milling machine is graphically shown in FIG. 11 as being made of a large number of parts, each of which is individually analyzed in a known manner. A typical joint stiffness for such a generic machine, as determined by finite analysis, is shown in FIG. 12 as being 797,448 at the bottom of column one which is substantially below the desired stiffness of 1,200,000 lbs./inch. A review of the components of the milling machine of FIG. 12 shows that there is a low stiffness of 1,250,000 lbs./inch for the top slide, feedbox and ballscrew, which is that portion of the machine that holds the tool on the part. In this instance, the other components were left the same and the low stiffness of 1,250,000 lbs./inch had to be increased to at least 4,500,000 lbs./inch to give the machine stiffness of at least 1,200,000 lbs./inch. To achieve this increase in stiffness, changes were made in the bearings, larger and heavier plates were used, and a larger diameter ball screw was substituted for the usual components, which changes resulted in an increased stiffness of 4,692,633 lbs./inch, as set forth in the chart of FIG. 13. Thus, the total stiffness became 1,332,945 lbs./inch. Using conventional manufacturing methods, a machine having a stiffness of 797,448 lbs./inch would have been installed and the parts tested would not then have met the tolerances because of too high of a deflection during cutting, resulting in a failure to hold the machine deflection in-process tolerance to 0.0012 inch, in this instance.

It is only by understanding the volumetric displacements and properly proportioning and assigning displacement tolerances that one can identify how stiff the machine must be.

The work holding fixture 15 that presents the part 22 to the tool is assigned another portion of the 0.0026 in locational tolerance which, in this instance, is 0.0005 inch. How well the machine is lined up with the tool presented to the part uses another portion of the tolerance, and is called "machine assembly" tolerance; and this tolerance includes tool depth position, tracking and alignment of the feed slide, and the squareness of the spindle face. A third variation is due to change in the cutting tool geometry particularly when changing cutting tools; and this is usually known, e.g., 0.0004 inch. Statistically, these tolerance deflections will be combined using the same root mean squared calculation, as above-described. In the above examples, are the following elements:
1. Fixture Assembly (0.0005 inch)
2. Machine Assembly (Depth Position, Tracking and Alignment)
3. Cutting Tool (0.0004 inch)
4. System Deflections (Workpiece and Machine Frame) (0.0018 inch)

The total deflection as shown in FIG. 7 is 0.0026 inch. Solve for X which is No. 2, Machine Assembly.

$$.0026 = \sqrt{.0005^2 + X^2 + .0004^2 + .0018^2}$$

$$\sqrt{.0026^2 - .0005^2 - .0004^2 - .0018^2} = X = .0017$$

Thus, the total machine assembly tolerance equals 0.0017 inch and this total tolerance is to be divided among its three elements, viz., depth position, tracking and spindle face alignment to the fixture. In FIG. 5, there is illustrated the volumetric representation for the milling of the joint face having the 13.24 inch width and a 44 inch length. The total tolerance of 0.0017 must be split between these three elements. The tracking of the slide will be assigned 0.001 inch, as shown in FIG. 5 between lines 40 and 41. The error of positioning the tool to full depth is assigned 0.00035 inch tolerance between lines 43 and 40. The spindle face alignment to the fixture is allowed 0.00035 inch, as shown on line 42. This volumetric depiction of FIG. 5 assists in the budgeting of the tolerances, as shown.

The problem now arises that it is difficult using conventional set-up techniques to hold very fine tolerances such as the 0.00035 full depth for the tool. Generally speaking, there is nothing in the machine that can be measured to with the accuracy of 0.00035 inch. This problem is solved by the use of datum reference targets 70 including lower targets 70A and 70B on one side 15A of the fixture 15 and upper target 70C.

In order to set fixture 15 and cutting machine to the calculated positions using the in-process tolerance with as little error as possible, that is to very close tolerances, the three locator surfaces 32A, 32B and 32C are first set on the fixture to be within 0.0005 inch and then this plane is simulated on the outside of the fixture by datum reference surfaces or targets 70 which are positioned within 0.0002 inch with respect to the locators 32A, 32B and 32C. The respective targets used to set the spindle perpendicularity include an upper target 70A mounted on the fixture 15 to an upper milled block surface 71 and a lower target 70B (FIG. 4) mounted on a lower milled block surface 72 on the fixture 15. A third lower target 70D (FIG. 2) is mounted beneath the upper target 70A and fastened to a milled surface 73 on the fixture 15. The targets have planar surfaces 83 which are in planes parallel to the plane defined by the locators 32A, 32B and 32C on the fixture 15. The targets are adjustable, as will be explained, and include the outer planar reference face 83 which is maintained parallel to the milled faces 71, 72 and 73 against which the targets 70A, 70B and 70C are abutted. To set spindle face 26 parallel to the planes defined by reference faces 83 on the targets 70A and 70B, an indicator bar is attached to the spindle face which is then rotated to have the indicator sweep the upper target 70A and then the lower target 70B; and the difference in indicator readings is noted. Suitable base leveling means such as wedges are then adjusted until the spindle face is within the desired in-process tolerance, in this instance, 0.00035 inch.

The movement of a feed slide 77 (FIG. 2), which slides on a machine base 78 to carry the cutting head 30 along the 44 inch cut herein described, and this "tracking" is also adjusted to be within 0.001 inch. An indicator (not shown) is attached to the feed slide and is brought against the lower target 70B, and then swept across to the target 70D at the other side of the fixture 15, and at the same height as the target 70B but spaced laterally therefrom by a distance greater than the 44 inch cutting travel of the cutting head. The indicator readings at the respective targets are noted and suitable adjusting means 79 (FIG. 2) are adjusted until the feed slide runs within a tolerance of 0.001 inch along its transverse cutting path.

To precisely locate the depth of cut of the cutting tool relative to the part 22 on the fixture 15, a target 70C is provided on the cutting head 30 at a precise and known location from the spindle face. This target is opposite the target 70B on the fixture (FIG. 2). An indicator is positioned to measure precisely the distance between the targets 70B and 70C to hold them to set up depth dimension which, in this instance, is 8.411 ±0.0002 inch. A stop 80 (FIG. 2) is precisely machined on the feed slide to be abutted by the spindle to limit its travel toward the fixture within the in-process tolerance dimension of 0.0002 inch, in this instance.

When drilling holes in the deck face, four targets (not shown) are provided on the opposite side of the fixture. There are two upper targets and two lower targets (now shown). These four targets are used by placing a gauge plate thereon, which has holes therein for precisely positioning pivot blocks carrying bushings which support and guide the rotating tool bits during cutting and then are swung up and away after the holes have been bored. Reference targets may be also in other positions than described herein, e.g., they may be set at angles to the horizontal and vertical planes to locate the cutting of the metal at the desired angle within a very close tolerance. The position and location of targets provide reference planes and allow the measurement of reference dimensions to provide for initial set up to the in-process tolerance dimensions and as a later check for realignment, as will be explained.

It is preferred to record the precise position of the target face 83 from its respective locator surface. Thus, for example, the spindle face 26 is the locator surface for the target 70C on the spindle face 26 and indicia are marked adjacent this target with the set up dimension which, in this instance, is 8,506±0.0001 inch. Also, the micrometer setting of the target is recorded. Both of these indicia are marked on a plate 61 secured to the cover 60 enclosing the target 70C. This information is also marked on the machine alignment print and is stored in a computer database. The distance between the locator surface 32C on the fixture 15 and target 70A is also recorded on a plate 61 on the cover 60 enclosing the target 70A; and this distance is 8.1584±0.0001 inch. The lower targets 70B and 70D are also set at this same distance 8.1584±0.0001 inch from the X1–X2 plane through the locators 32C and 32A. Their respective micrometer settings of their targets is also recorded on their respective cover plates and in the computer database. The locator surface 32B is 4.4685±0.00025 inch from the datum plane defined by the target surfaces 83 of the targets 32A and 32C. Thus, when a part is inspected and is found to be out-of-tolerance from a particular cutting machine in the process, the particular out-of-tolerance dimension will lead one to check the dimensions between the targets and the locator surfaces. For instance, if a locator surface 32A had become worn or otherwise damaged, a gauge between the target 70A and 32A would show that the dimension was not equal to the dimension 8.1584±0.0001 inch stamped on the cover of target 70A. Suitable steps would have to be taken to again have the locator surface restored to the correct dimension. At the time of uncovering the target 70A, its micrometer setting would be checked against the recorded setting on the cover plate 61 to assure that it had not been moved since the original setup. If the tool is worn or the stop 80 for the spindle is worn, the depth of cut may be out-of-tolerance. The distance between the target 70C on the head and 70B on the fixture may be checked to assure the full depth position is in tact, and appropriate correction action may be taken.

The target surfaces 83 are adjustable on the targets 70A–70D, and may be adjusted by turning their micrometer adjustment to re-position the target surfaces, as will be explained in detail hereinafter. For example, when setting up the system and running fifty parts for the first time during an acceptance run, if it were found that the depth of cut was off 0.0002 inch from the 8.411 ±0.0002 inch dimension, the micrometer could be turned on the target 70C to shift its surface 83 a distance of 0.0002 inch, and then the stop for the spindle could then be adjusted to be moved through the same 0.0002 inch relative to the adjusted target surface. The same micrometer setting will be on the cover plate 61, on the drawing and stored in the data bank for future reference. The distance from the target 70A to target 70B would remain at 8.411±0.0002 inch. This is important because other dimensions of other machining cuts may be related to this dimension. This simple and easy adjustment of the targets is in contrast to the fixed, permanent locators 32 on the fixture 15; and the targets provide faster set-up time initially as well as when making changes based on empirical data from actual machined parts. The granite plain can be captured to reflect the condition of the machine after acceptance.

After a considerable amount of machining, wear may occur and parts may be out of tolerance. To find out what is wrong, the covers 60 may be removed from the targets 70A–70D and the measurements may be again made for feed slide tracking, spindle face perpendicularity, and full depth position and fixture locator surfaces relative to targets. Since the in-process dimensions and in-process tolerances all used initially to set up the machine and its fixturing are on the prints and in the chart of FIG. 10, as well as in a database, the operator can easily determine which portions of the machine have become worn and are not at their original set-up dimensions and take the appropriate corrective action to place the machine and fixture back at the original set up dimensions which should result in the parts again being machined to tolerance. This is in contrast to the usual cut and try approach where the final part is measured, and the operator uses his experience and expert judgment to try to make appropriate adjustments to try to again make parts within tolerance. The present invention allows the operator to identify the source of the problem within the machine by using and measuring from the targets 70A–70D, which the operators could not do heretofore, because the operators had neither the in-process tolerances herein provided nor the targets herein provided. Pursuing this depth of cut problem further, the source of the error might not be at the machine 20 cutting the valve bore surface 34 to the proper depth, but might be at either the semi-finish joint face milling machine 19 or the finish milling machine 21 one or both of which may not be milling their surfaces to the proper tolerance. By taking five samples from each of these machines 19, 20 and 21 and measuring the samples by inspection from each machine, it may be determined that semi-finish joint face machine 19 is not cutting its planar surface to tolerance. That is, the inspected parts must meet the in-process tolerance on the chart of FIG. 10. By removing the target covers 60 and checking the target to locator surface dimensions, the source of error at the joint face machine 19 will be identified; and it may be corrected by bringing each portion of the joint face machine back to the design dimensions, thereby eliminating the source of error at the joint face machine that ultimately caused the valve bore depth to be out of tolerance. Without the targets and this type of in-process tolerances stored on the print drawings and/or in chart of FIG. 10, the operator would have a difficult time identifying this source of error and taking the appropriate remedial steps to eliminate the source of error. The operator's usual approach would be to cut and try with depth of cut and then try other adjustments. But because all of these tolerances are interrelated, the adjustments to one machine to try to obtain the proper depth for the counterbore may have an adverse effect on other tolerances for other dimensions of the finished part. Thus, the ability to re-establish the original dimensions and tolerances used in initial set up by use of the targets and the stored dimensions (such as on the mechanical drawings or database) provides a tool for identifying later sources of error and for taking remedial action more quickly and more effectively than with prior systems. The chart of FIG. 10 and the in-process tolerances on the prints provide a record of the allocation of tolerance from the total budget of tolerances for the part and by using the targets and these in-process tolerances, a particular source of tolerance variation may be identified, such as, for example, tracking, failure of a fixture locator surface, wear of the spindle stop, loss of perpendicularity of the spindle face, etc. A failure of any one of these can result in the part being out of tolerance. Because the charts, drawings and targets contain the dimensions, it is possible to check for future variations and their extent so you can take corrective steps. The invention provides an improved find-and-fix routine for operators of the transfer line not heretofore available to them.

The targets may take various shapes and forms but should be very accurate devices and preferably very finely adjusted so that they can provide references needed such as within 0.0001 inch. The illustrated target 70 (FIGS. 14–16) has an outer flat planar surface 83 which will be contacted by the various indicating or gauging instruments. The target 70 is secured to the machine cutting head 30 or fixture 15 at one of the milled target surfaces 71–74. To this end, the outer cylindrical housing or body 85 has an integral flange 87 with holes for screws. The underside 89 of the flange 87 is finished very accurately, and then in a finish operation, the outer planar surface 83 is ground very precisely parallel to the flange's undersurface 89. This undersurface of the flange is to be secured by three screws to one of the precisely machined surfaces 71–74 on the fixture or cutting head. The planar surface 83 is at the outer end of an axially movable, cylindrical cartridge 94 having an integral thread 95 meshed with a thread 97 on a rotatable nut 98 surrounding the cartridge. The lower end of the cartridge has a precisely ground shaft portion 99 that is precision ground to rotate within a precision dimensioned bore 101 of the housing. These precisely ground and dimensioned shafts 99 and bores 101 hold the axis of the cartridge 94 on a rotational axis 103 through the cartridge. Prior to establish such a fine fit of the shaft and bore, it was found that the planar surface 83 could cock or change its attitude when turned in and out, relative to the nut 98. The cocked planar surface interfered with the precision needed. The threads on the nut and cartridge 95 and 97 are preloaded by a series of springs 105 to prevent backlash. Herein, six compression springs are loaded in chambers 107, defined by walls 109 in the housing 85. The upper ends of the springs are bottomed against a cross wall 110 and the lower ends of the springs push against a bottom plate 111 at the lower end of the housing. A pair of diametrical keys 113 are fitted into openings 114 in the housing wall 109 to keep the cartridge from rotating with turning of the nut 98.

Thus, turning of the nut causes axial movement of the cartridge and its planar surface 83 without any rotation of the cartridge. A bolt 119 extends through an opening in the bottom plate and has a thread 121 meshed with a thread 123 in an internal bore in the lower shaft end of the cartridge. As the cartridge reciprocates in and out, the springs are further compressed or released slightly in compression.

To adjust the planar surface 83 axially in and out relative to the housing 85, a narrow wrench is used to grip a hexhead 125 formed on the nut 98 and the nut is turned with its screw thread 97 rotating on the cartridge thread 95. A zero indicator on the housing flange 87 will be aligned with the micrometer indicia 120 on the outer face of the nut 98. A turn of the nut through one marking moves the cartridge planar surface 83 axially through 0.0001 inch. A small O ring 129 is provided on the nut to seal against an inner bore wall 131 of the housing 85. In the illustrated embodiment of the invention, the outer, lower, cylindrical surface 133 (FIG. 14) of the housing 85 is spaced by a clearance with the receiving bore in the machine or fixture for the target housing. The preferred targets are inexpensive and very precise. The transfer system herein described uses one hundred and thirty (130) targets; so it is preferred that they be inexpensive as well as accurate.

What is claimed is:

1. A target for attaching to a locator surface on a machine or fixture and for providing an adjustable datum reference surface as part of a datum plane or a reference surface spaced at a predetermined distance from and parallel to a locator surface on a machine tool or a fixture, said target comprising:

a body having an inner flat, planar surface finished accurately for engaging against the precision locator surface of a machine or fixture;

a movable member having an outer flat, planar reference datum surface movably mounted on the body for movement relative to the body to be spaced parallel to the locator surface at a predetermined distance therefrom;

the reference datum surface adapted to cooperate with an indicator to establish a plane or a distance;

the movable member including a threaded shaft having a first precisely ground portion;

a second thread in the body threadedly mated with the threaded shaft; a bore in the body being precisely ground and mated with the first precisely ground portion to prevent a cocking of the outer flat, planar reference datum surface relative to the inner, flat planar surface as the threaded shaft is turned in the second thread on the body;

means acting between the body and the movable member to preload the same against unwanted movement relative to each other; and indicia associated with the body to indicate the in or out travel of the target datum reference surface relative to the body.

2. A target in accordance with claim 1 in which a cover is provided to cover and protect the outer flat, planar surface; and indicia on the cover indicates precise reference data with respect to the location of the outer flat, planar surface within the cover.

3. A target in accordance with claim 2 in which the means acting between the body and the movable member comprises a plurality of springs to prevent backlash turning of the threaded shaft in the thread of the body.

4. A target in accordance with claim 3 in which the body includes a rotatable nut carrying the body thread, and means on the movable member restricting it from turning with rotation of the nut.

5. A target in accordance with claim 4 in which the indicia associated with body and movable member comprises a micrometer scale such that rotational movement relative to the micrometer scale results in a known amount of axial displacement of the datum reference surface.

* * * * *